(12) United States Patent
Chkodrov et al.

(10) Patent No.: US 7,555,744 B2
(45) Date of Patent: Jun. 30, 2009

(54) METHOD AND SYSTEM FOR DEBUGGING A PROGRAM FROM WITHIN A THREAD OF EXECUTION OF THE PROGRAM

(75) Inventors: Gueorgui B. Chkodrov, Redmond, WA (US); Narinder Kaur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/970,793

(22) Filed: Oct. 21, 2004

(65) Prior Publication Data
US 2005/0086644 A1    Apr. 21, 2005

Related U.S. Application Data

(63) Continuation of application No. 09/606,973, filed on Jun. 28, 2000, now Pat. No. 6,915,509.

(51) Int. Cl.
*G06F 9/44* (2006.01)
*G06F 15/16* (2006.01)
*G06F 3/00* (2006.01)

(52) U.S. Cl. .................. 717/124; 709/230; 709/232; 719/312; 719/320

(58) Field of Classification Search ......... 717/124–135; 709/230–237; 714/37, 38; 719/311–317, 719/320
See application file for complete search history.

(56) References Cited

U.S. PATENT DOCUMENTS

| | | | | |
|---|---|---|---|---|
| 5,371,746 A | * | 12/1994 | Yamashita et al. | 714/38 |
| 5,611,043 A | * | 3/1997 | Even et al. | 714/38 |
| 5,630,049 A | * | 5/1997 | Cardoza et al. | 714/25 |
| 5,764,989 A | * | 6/1998 | Gustafsson et al. | 717/129 |
| 5,778,230 A | | 7/1998 | Wimble et al. | |
| 5,787,245 A | * | 7/1998 | You et al. | 714/38 |
| 5,794,046 A | * | 8/1998 | Meier et al. | 717/128 |
| 5,799,142 A | | 8/1998 | Toyoda | |
| 5,815,653 A | * | 9/1998 | You et al. | 717/134 |
| 5,819,093 A | * | 10/1998 | Davidson et al. | 717/126 |
| 5,892,941 A | * | 4/1999 | Khan et al. | 703/22 |
| 5,933,639 A | | 8/1999 | Meier et al. | |
| 6,002,870 A | * | 12/1999 | Faulkner et al. | 717/134 |
| 6,042,614 A | * | 3/2000 | Davidson et al. | 717/116 |

(Continued)

OTHER PUBLICATIONS

Harkema et al. "Performance Monitoring of Java Applications", 2002, ACM, p. 114-127.*

(Continued)

*Primary Examiner*—Wei Y Zhen
*Assistant Examiner*—Qing Chen
(74) *Attorney, Agent, or Firm*—Lee & Hayes, PLLC

(57) ABSTRACT

In a method and system for debugging a program, a debugging module is loaded into a normal thread of execution of the program. A user may then send commands to the debugger module from a command console module operating in a safe separate process. The debugger module receives the commands and converts them into function calls to objects that are accessible by the program. This allows the user to interact manually with the objects and achieve substantially the same responses from the object as the program itself would have obtained during its normal execution. Thus the user can effectively debug the program without having to know the internal structure of any of its constituent objects.

11 Claims, 10 Drawing Sheets

U.S. PATENT DOCUMENTS

| | | | |
|---|---|---|---|
| 6,119,247 A * | 9/2000 | House et al. | 714/38 |
| 6,152,045 A | 11/2000 | Powell et al. | |
| 6,158,045 A * | 12/2000 | You | 717/124 |
| 6,199,099 B1 | 3/2001 | Gershman et al. | |
| 6,219,782 B1 * | 4/2001 | Khan et al. | 712/227 |
| 6,253,368 B1 | 6/2001 | Nelin et al. | |
| 6,263,456 B1 * | 7/2001 | Boxall et al. | 714/38 |
| 6,324,683 B1 * | 11/2001 | Fuh et al. | 717/124 |
| 6,353,923 B1 * | 3/2002 | Bogle et al. | 717/128 |
| 6,378,124 B1 * | 4/2002 | Bates et al. | 717/129 |
| 6,378,125 B1 * | 4/2002 | Bates et al. | 717/129 |
| 6,480,818 B1 * | 11/2002 | Alverson et al. | 714/30 |
| 6,516,460 B1 * | 2/2003 | Merks et al. | 717/124 |
| 6,681,384 B1 * | 1/2004 | Bates et al. | 717/129 |
| 6,721,776 B1 * | 4/2004 | Erickson et al. | 717/102 |
| 6,804,813 B1 * | 10/2004 | Willems et al. | 717/125 |
| 6,978,444 B1 * | 12/2005 | Farchi et al. | 717/129 |
| 7,150,006 B2 * | 12/2006 | Bliss et al. | 717/124 |
| 7,197,745 B2 * | 3/2007 | Ray et al. | 717/127 |

OTHER PUBLICATIONS

Ji et al. "Performance Measurements for Multithreadded Programs", 1998, ACM, p. 161-170.*

Miyamoto et al. "Evaluating Titanium SPMD Programs on the Tera MTA", 1999, ACM, p. 1-14.*

Schulz et al. "A Thread-Aware Debugger with an Open Interface", 2000, ACM, p. 201-211.*

Pellegrino, Mike, "Improve Your Understanding of .NET Internals by Building a Debugger for Managed Code," Nov. 2002, MSDN Magazine, p. 1-16.*

Guy Eddon; Henry Eddon; Inside COM+ Base Services; Microsoft Press, Redmond, WA, 1999, pp. iii-xvi and pp. 1-28.

William Rubin; Marshall Brain; Understanding DCOM; Chapter 10, COM Threading Models; Prentice Hall, Inc., Upper Saddle River, NJ, 1999, pp. 151-166.

* cited by examiner

METHOD AND SYSTEM FOR DEBUGGING A PROGRAM FROM WITHIN A THREAD OF EXECUTION OF THE PROGRAM

CROSS-REFERENCE TO RELATED PATENT APPLICATION

This patent application is a continuation of U.S. patent application Ser. No. 09/606,973, Now U.S. Pat. No. 6,915,509, filed Jun. 28, 2000.

TECHNICAL FIELD

This invention relates generally to computer program debugging techniques and, more particularly to a method and system for debugging a program from within a thread of execution of the program.

BACKGROUND

An object is a logically grouped set of computer-executable functions and computer-readable data. Objects are well-known to programmers of object-oriented languages such as the C++ programming language, the ADA programming language, the PERL programming language, and the JAVA programming language. While the implementation details of objects varies from programming language to programming language, they all have certain characteristics in common. One such characteristic is known as "encapsulation." Encapsulation means that an object performs its designated purpose in a manner that is hidden from the rest of the program in which it is being used. The hidden data and functions that an object uses to perform its purpose are collectively referred to as private data. Outside entities, such as a main program or a function, may only access an object through its public functions and data. The set of public functions and data for an object is often referred to as a public interface or programming interface. An object may be written according to a variety of well-known standards, including the MICROSOFT COMPONENT OBJECT MODEL (COM) standard, the MICROSOFT DISTRIBUTED COMPONENT OBJECT MODEL (DCOM) standard, and the common object request broker architecture COMMON OBJECT REQUEST BROKER ARCHITECTURE (COBRA) standard. An object may also be compiled into machine code, assembly code, binary code, byte code, or the like, and may be executed on a computer as, for example, an executable file, a DLL, or the like.

One of the advantages of writing a program using an object-oriented language is that the program may be broken up into set of self-contained units or "objects." Each object in an object-oriented program typically has a set of public functions and public data that can be accessed by other parts of the program, and a set of private functions and private data that are hidden from the rest of the program. Anything outside an object that wishes to use the object to perform some task must access the object using the public functions and data. How the object performs its task is hidden from the outside through the use of private functions and data. In effect, an object functions as a "black box" that can receive data, perform a task, and possibly return a result to a caller. Because the internal implementation details of an object are hidden, it is very convenient to create libraries of objects that can be used over and over in multiple programming projects. The public functions and data of an object are typically exposed as one or more interfaces. An interface generally contains pointers to classes that contain the public functions and data.

Frequently, libraries of objects are developed and sold along with programming packages to relieve programmers of the burden of creating their own objects from scratch. The objects in such libraries are generally provided as compiled binary files for the sake of convenience and to keep their internal implementation details confidential. As long as a programmer knows what a particular object is capable of doing, what public functions it exposes, and what inputs it requires, he or she does not have to know how the function is implemented, and may, in fact, create a program from a set of objects written by someone else.

Currently, debugging a program that uses objects often requires more than just a "black-box" knowledge of the objects. Specifically, it may require a programmer to learn the internal structure of the objects and thereby violate the principle of encapsulation. It is frequently the case, however, that data contained in an object is not present in the memory to which the programmer has access, thus making it nearly impossible to learn its internal structure. For example, a DCOM object may have a proxy on one machine of a network while the bulk of its functions and data are located on another machine of the network and are only accessible by a stub. There are also cases in which a public interface pointer actually points to a thread-specific proxy and not to the real data, such as when the "apartment threading model" is used.

SUMMARY OF THE INVENTION

In accordance with the foregoing, a novel method and system for debugging a program is provided. According to the method and system, a debugging module is loaded into a normal thread of execution of the program. A user may then send commands to the debugger module from a command console module operating in a separate process. The debugger module receives the commands and converts them into function calls to objects that are accessible by the program. This allows the user to interact manually with the objects and achieve substantially the same responses from the object as the program itself would have obtained during its normal execution. Thus, the user can effectively debug the program without having to know the internal structure of any of its constituent objects.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
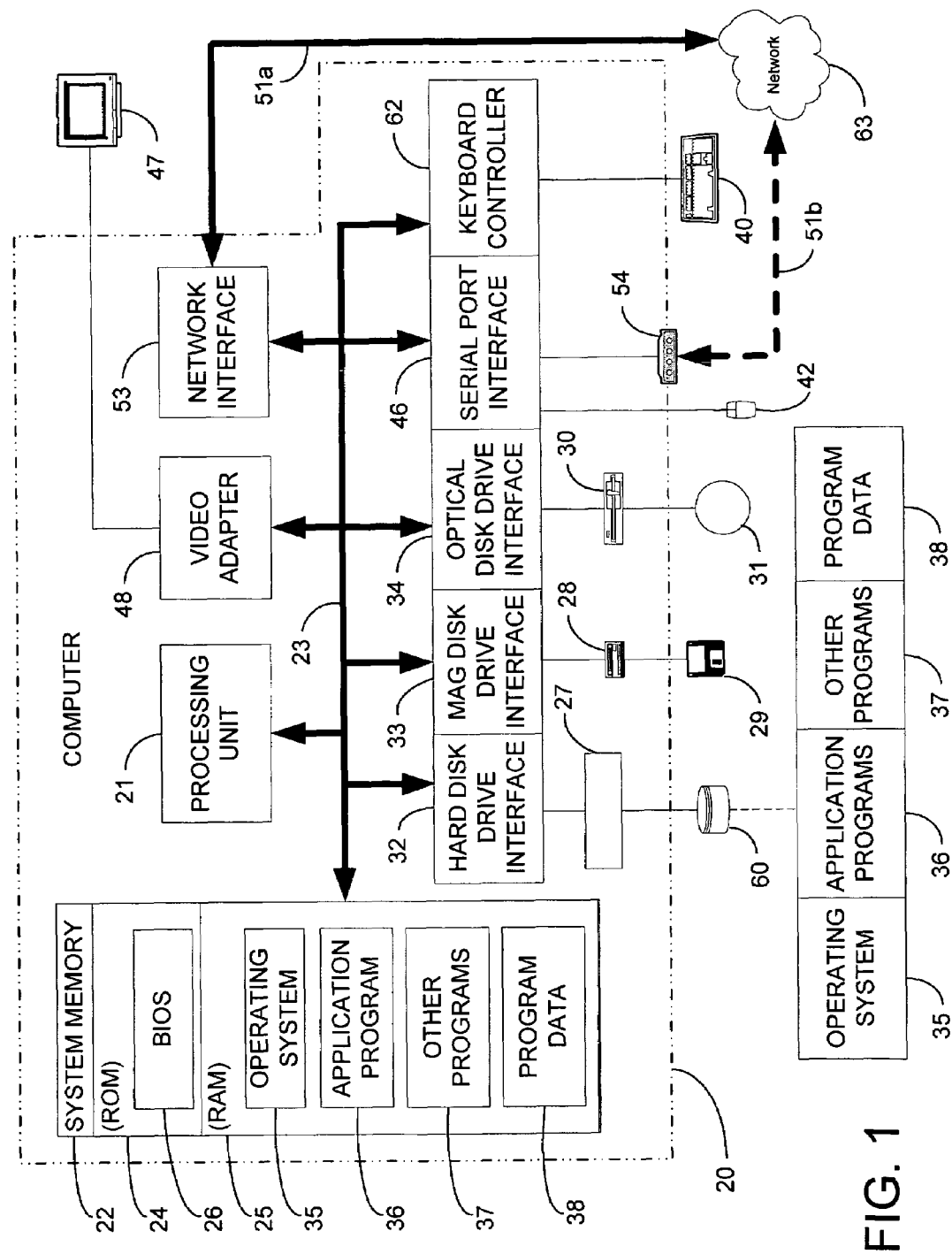
FIG. 1 is a block diagram generally illustrating an example computer environment in which the invention may be used.

Turning to the drawings, wherein like reference numerals refer to like elements, an example environment for implementing the invention is shown in FIG. 1. The environment includes a general purpose-computing device 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in the ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A user may enter commands and information into the computing device 20 through input devices such as a keyboard 40, which is typically connected to the computing device 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computing devices typically include other peripheral output devices, not shown, such as speakers and printers.

The computing device 20 may operate in a networked environment using logical connections to one or more devices within a network 63, including another computing device, a server, a network PC, a peer device or other network node. These devices typically include many or all of the elements described above relative to the computing device 20. The logical connections depicted in FIG. 1 include a land-based network link, for which there are many possible implementations, including a local area network (LAN) link 51a and a wide area network (WAN) link 51b. Land-based network links are commonplace in offices, enterprise-wide computer networks, intranets and the Internet and include such physical implementations as coaxial cable, twisted copper pairs, fiber optics, wireless links, and the like. Data may transmitted over the network links 51a-51b according to a variety of well-known transport standards, including Ethernet, SONET, DSL, T-1, and the like. When used in a LAN, the computing device 20 is connected to the network link 51a through a network interface card or adapter 53. When used in a WAN, the computing device 20 typically includes a modem 54 or other means for establishing communications over the network link 51b, as shown by the dashed line. The modem 54, which may be internal or external, is connected to the system bus 23 via the serial port interface 46. In a networked environment, programs depicted relative to the computing device 20, or portions thereof, may be stored on other devices within the network 63.

Those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will also be made to one or more "programs" or "modules" executing on a computer system or being executed by parts of a CPU. A "program" or "module" is any instruction or set of instructions that can execute on a computer, including a procedure, function, executable code, dynamic-linked library (DLL), applet, native instruction, module, or the like. On many computers, programs and modules execute within an address space of the computer's memory, which is typically defined as a "process." The point of execution of the program instructions is often referred to as a "thread." As is conventional, multiple threads of execution may exist for a single program in a process. A program or module may also include a commercial software application or product, which may itself include several programs or components. However, while the invention is being described in the context of software, it is not meant to be limiting as those of skill in the art will appreciate that various of the acts and operation described hereinafter may also be implemented in hardware.

The invention is generally realized as a novel method and system in which a novel debugger (hereinafter referred to as an "in-thread debugger") operates inside a thread of a program being debugged (hereinafter referred to as the "debuggee thread"). By operating within the debuggee thread, the in-thread debugger is able to make calls to objects that are known to the debuggee thread and achieve the same results that would be achieved by the thread itself. In a preferred embodiment of the invention, the in-thread debugger communicates with an outside entity, such as a command line console, through a socket. This allows a user, such as a test engineer, to halt the debuggee thread during execution, manually send calls to the in-thread debugger module from outside of the thread, and observe the resulting behavior of the accessed objects without having to know the internal details of the objects.

Figure 2:
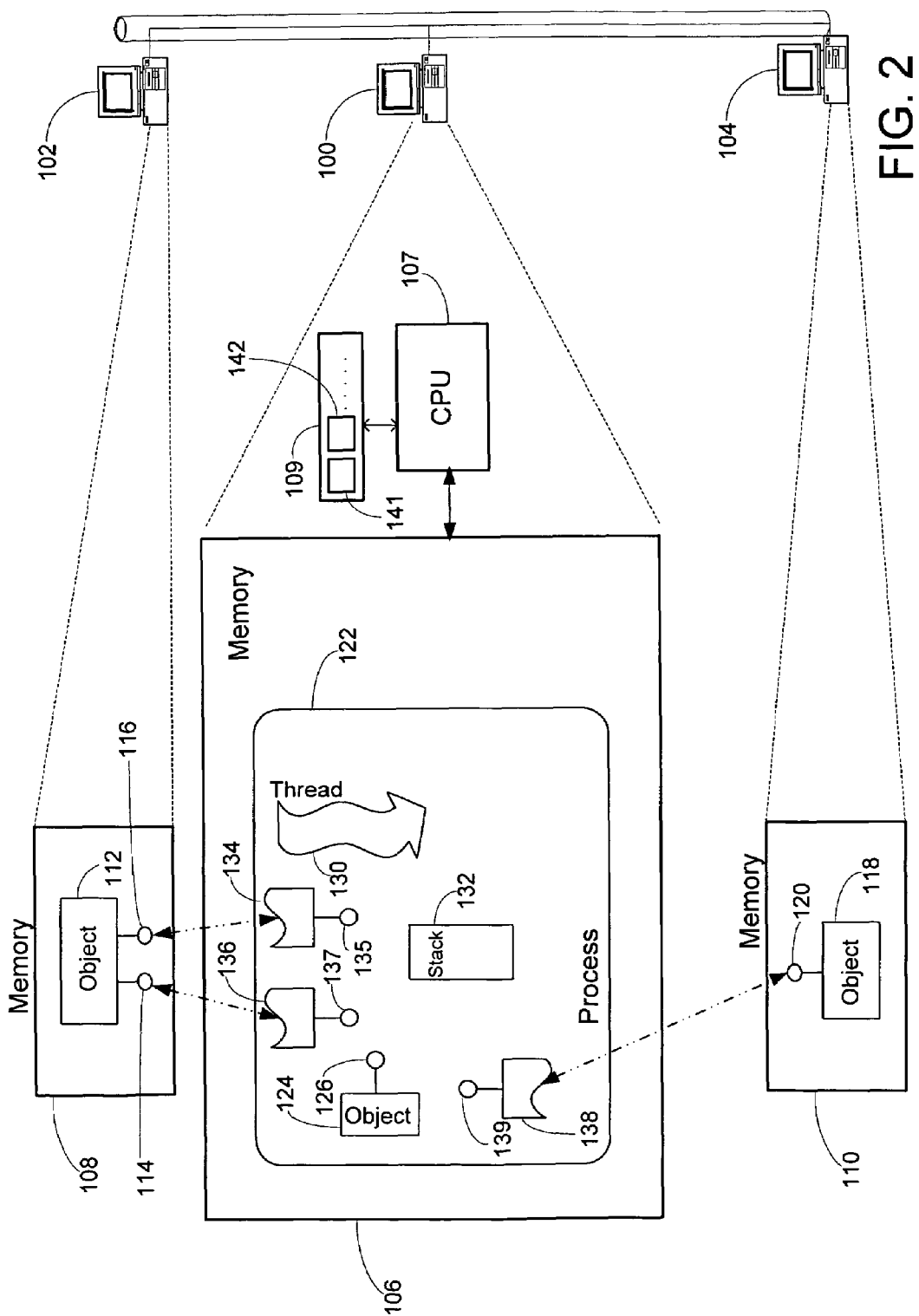
FIG. 2 is a block diagram generally illustrating an example of a software environment in which a debugger may operate in accordance with the teachings of the invention.

Referring to FIG. 2, an example of a software environment in which the in-thread debugger may be introduced is shown. A computer 100 is communicatively linked to computers 102 and 104. The computer 100, 102 and 104 include memories 106, 108 and 110 respectively. The computer 100 also includes a CPU 107 that is communicatively linked to the memory 106. The CPU 107 includes a register memory 109 having one or more registers for holding frequently accessed data. The computers 102 and 104 also have CPUs (not shown). The memories 106, 108 and 110 may be main memory, cache, disk or other types of memory. The memory 108 includes an object 112 having public interfaces 114 and 116, while the memory 110 of the computer 104 includes an object 118 having a public interface 120. The memory 106 also includes a process 122 that defines the address space for a program in the memory 106. Although the process 122 is depicted as a contiguous block, it is understood that it may, in fact, be distributed in pieces throughout the memory 106.

The process 122 includes an object 124 having a public interface 126. The point at which the CPU 107 is currently executing instructions of the program within the process 122 is depicted as a thread 130. The process 122 may have multiple threads of execution running simultaneously or nearly simultaneously, with the CPU 107 executing each thread for a period of time before moving to another thread. The process 122 also includes: a stack 132 for holding the data of the thread 130, a proxy 134 for representing the interface 116 of the object 112, a proxy 136 for representing the interface 114 of the object 112, and a proxy 138 for representing the interface 120 of the object 118. Each proxy has a respective public interface 135, 137 and 139. The object 124 may be implemented as a COM object, while the objects 112 and 118 may be implemented as DCOM objects. As is conventional, a proxy contains a pointer, an address or other reference that can be used to locate the object represented by the proxy. Although not shown, the memories 108 and 110 may also have stubs, for allowing remote clients to call functions of the objects 112 and 118. For example, if implemented in DCOM, the proxy 138 may contain a reference to a stub in the memory 110, which itself may contain a pointer to the interface 120.

The register memory 109 and the stack 132 contain data that allows the CPU 107 to execute code along the thread 130. Specifically, the register memory 109 contains the state data for the thread 130, including a pointer 142 for holding the address of the next line of code to be executed by the CPU 107, and a pointer 141 to the stack 132. The state information includes the contents of other registers as well. For example, when implemented using INTEL architecture the thread state information may include the contents of the general purpose registers and the contents of the flag registers. The stack 132 contains pointers that allow the thread 130 to access the objects 124, 112 and 118, including a pointer to the public interface 126, and pointers to the proxy interfaces 137, 135 and 139 which represent the interfaces 114, 116 and 120 respectively.

Figure 3:
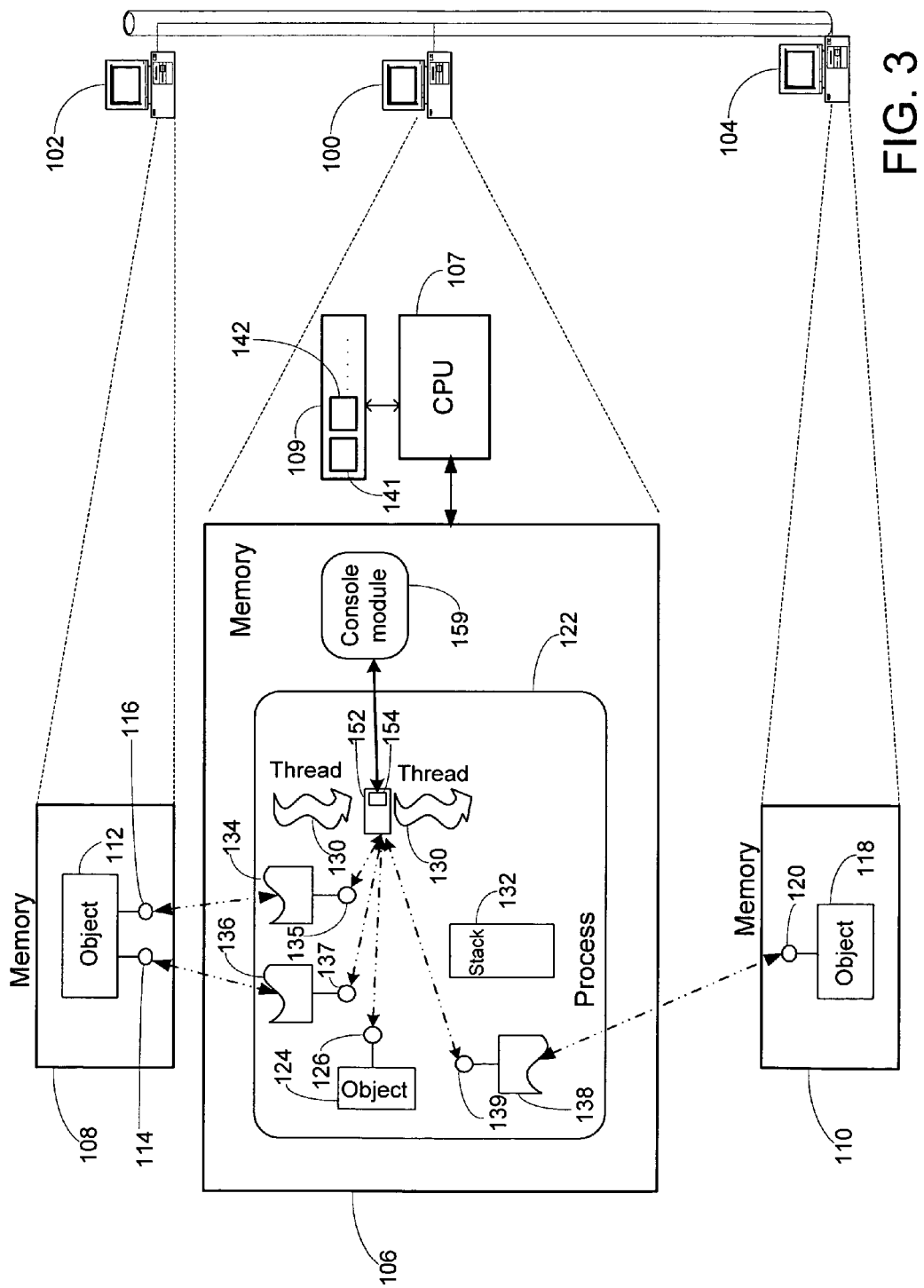
FIG. 3 is a block diagram generally illustrating an example of how a debugger may operate in accordance with the teachings of the invention.

Referring to FIG. 3, an overview of how an in-thread debugger may operate in accordance with the teachings of the invention will now be described using the thread 130 of FIG. 2 as an example. The execution of the thread 130 is first halted, such as by a "break" command inserted into the program code or as a result of an error. The current state of the thread 130 is copied from the register memory 109 to the thread stack 132. An in-thread debugger module 152 is executed within the thread 130. The in-thread debugger module 152 has a communication link 154, such as a TCP/IP socket, that allows outside entities to communicate with the in-thread debugger module 152. A console module 159 executes outside of the process 122 and interacts with a user. Although the console module 159 is depicted as being executed on the same computer as the debuggee thread 130, it may also be executed on a separate computer that is linked for communication with the computer 100.

The user may enter commands into the console module 159. The console module 159 sends the commands to the in-thread debugger, which converts the commands into corresponding function calls, and sends the function calls to one or more of the objects 124, 112 and 118. When the in-thread debugger module 152 receives responses back from the accessed objects, it relays those responses to the console module 159. The in-thread debugger module 152 is able to access the objects 124, 112 and 118 by virtue of the fact that it operates within the context of the thread 130 and thus can safely call interface pointers that are normally used in this thread. This allows that the user to make functions calls normally to one or more of the objects from within the context of the thread 130. Since the objects are called from the context of a thread of the program, the objects should behave as if they were being called during normal execution of the program. Once the user is ready to resume execution of the thread 130, the thread state information is restored to the register 109 by copying it from the stack 132.

Figure 5:
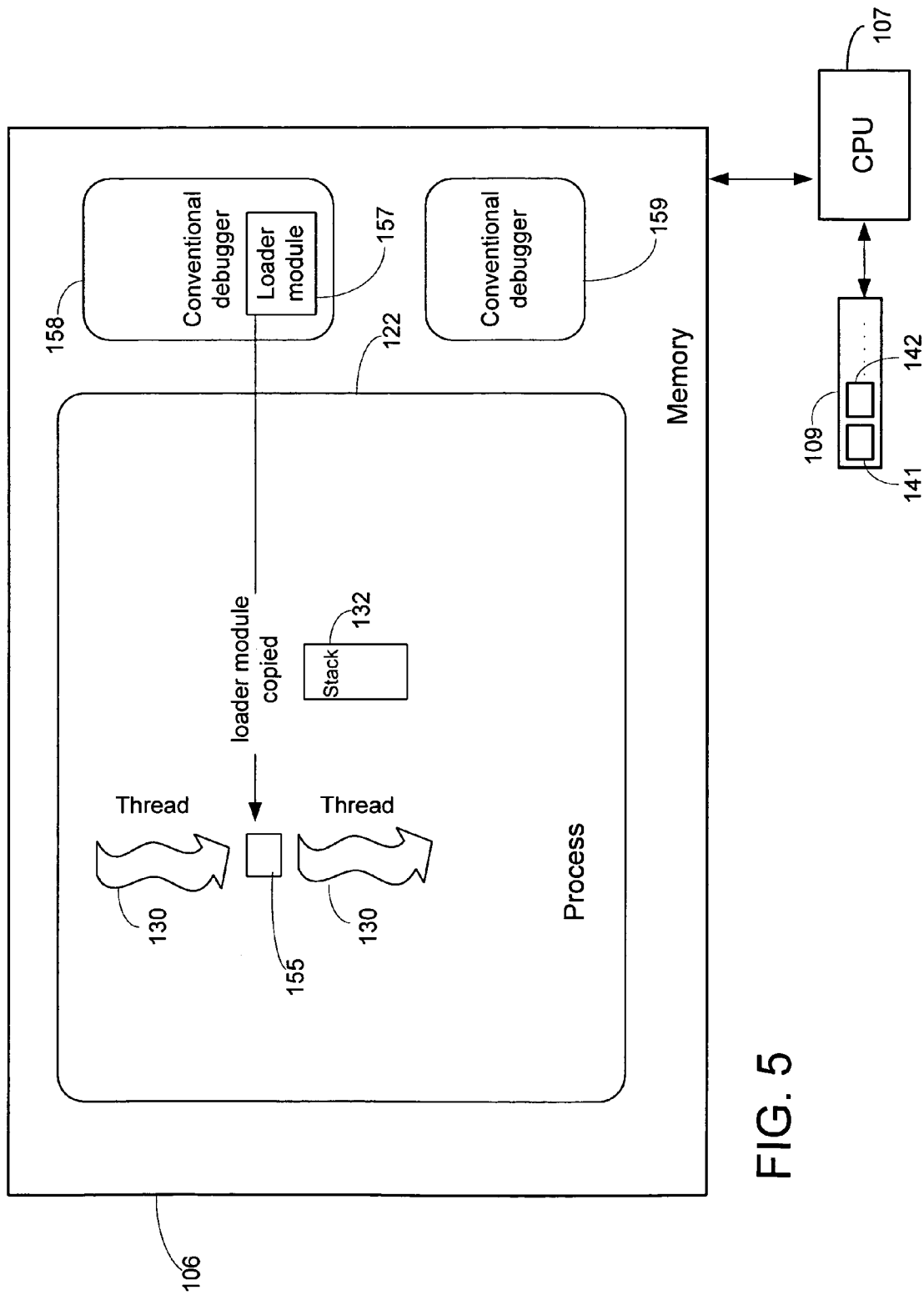
FIG. 5 is a block diagram showing an example of how a debugger may be inserted into the context of a thread in accordance with the teachings of the invention.
Figure 6:
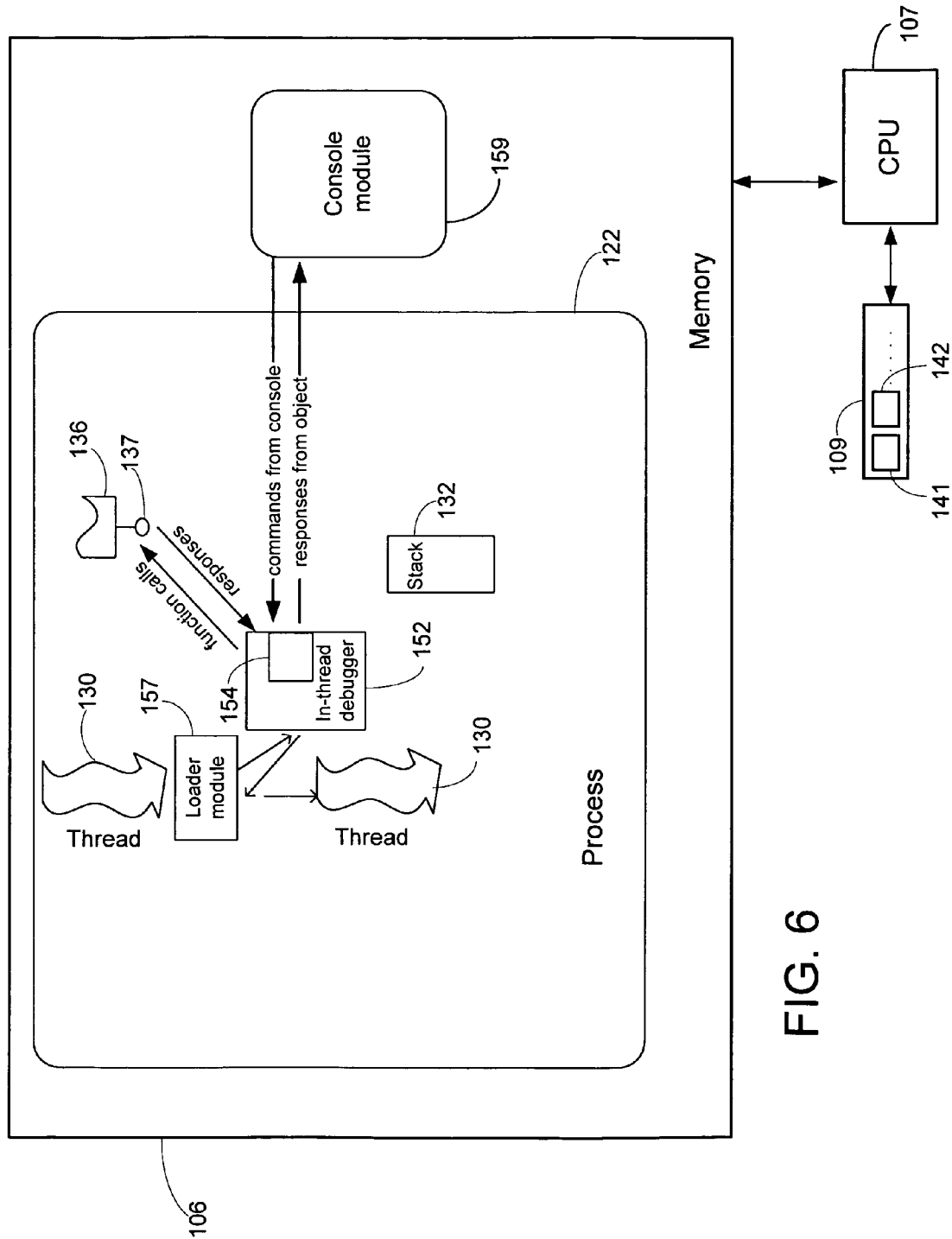
FIG. 6 is a block diagram generally illustrating how a loader module, an in-thread debugger module, and a conventional module may interact in accordance with the teachings of the invention.

It is understood that there are other ways to initiate the in thread debugger. For example, the in-thread debugger 152 may be inserted into the process space of a running program and given the thread context of the running program, provided that the user has the proper access permissions. Referring to the flowchart of FIG. 4, and the diagrams of FIGS. 5-7, an example of how the in-thread debugger may be executed within a thread's context according to the teachings of the invention will be described, using the environment of FIG. 2 and the thread 130 of FIG. 3 as a starting point.

Figure 4:
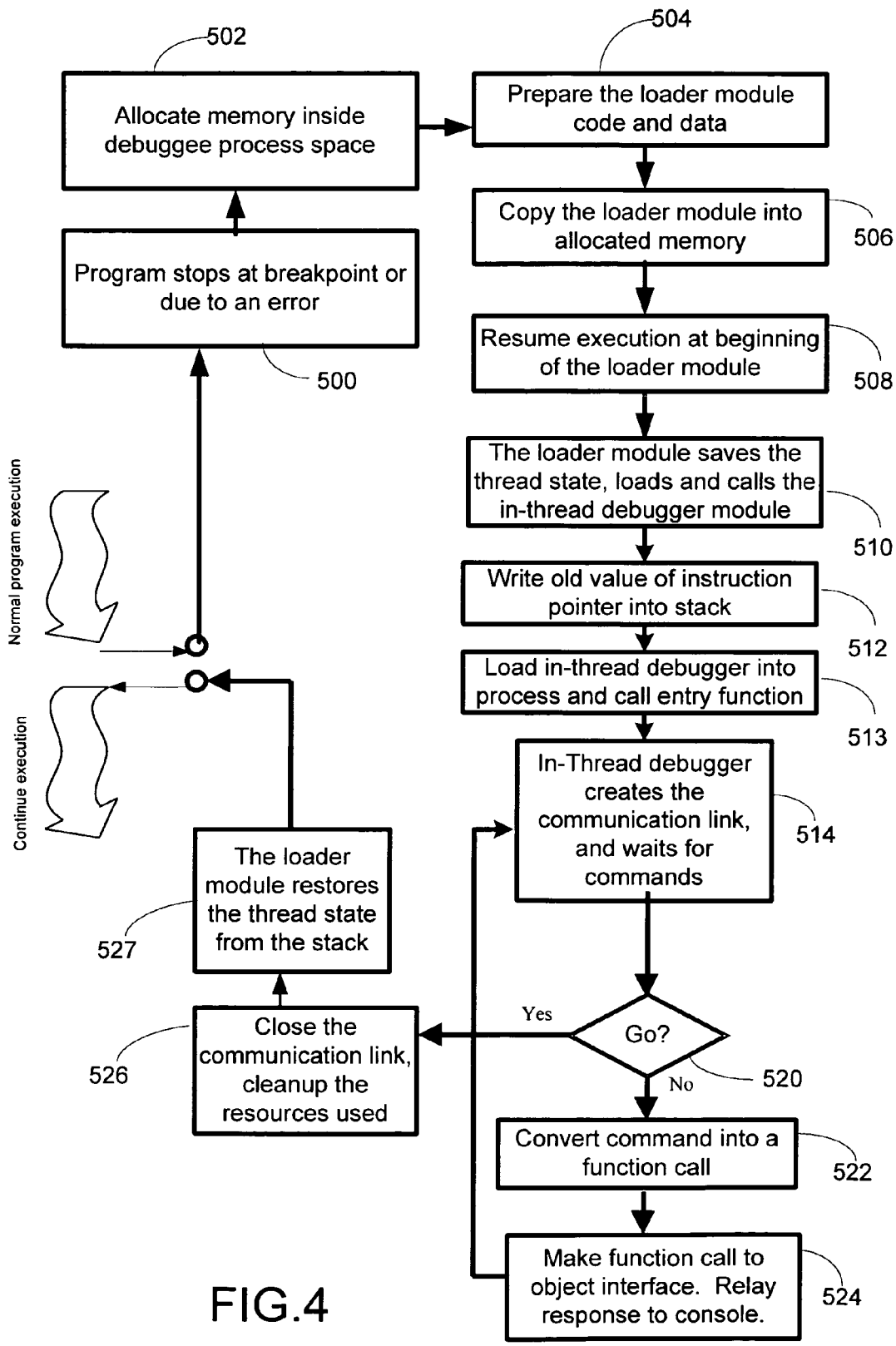
FIG. 4 is a flowchart generally showing an example of the steps that may be followed to insert a debugger into the context of a thread in accordance with the teachings of the invention.

Turning to FIG. 4, the thread 130 (FIG. 5) is halted due to a previously defined breakpoint or due to an error at step 500. At step 502, a conventional debugger 158 allocates a block 155 of memory inside the process 122. In the WINDOWS 2000 operating system environment, this may be accomplished through the use of the "VirtualAllocEx" Application Programming Interface (API). At step 504, the conventional debugger 158 creates a loader module 157 for loading an in-thread debugger into the process 122. In creating the loader module 157 the conventional debugger 158 reads the current value of the instruction pointer 142 and writes the value into the loader module 157. The loader module 157 may also include: the file name of an in-thread debugger module, the name of the in-thread debugger entry point, the name and port of the machine with which the in-thread debugger will communicate during the debugging session, and the code for loading the in-thread debugger.

At step 506 the conventional debugger copies the loader module 157 into the memory block 155. At step 508, the conventional debugger 158 stores a new value for the instruction pointer 142 into the register memory 109. This new value will be the address of the beginning of the memory block 155. The execution of the thread 130 is then resumed at this new address (block 155). The loader module 157 (copied from the conventional debugger 158) then executes in the context of the thread 130. At step 510, the loader module 157 saves the current state of the thread 130. When implemented using INTEL architecture, this may be accomplished by, for example, pushing the contents of the general-purpose registers and the flag registers of the register memory 109 onto the stack 109.

Figure 7:
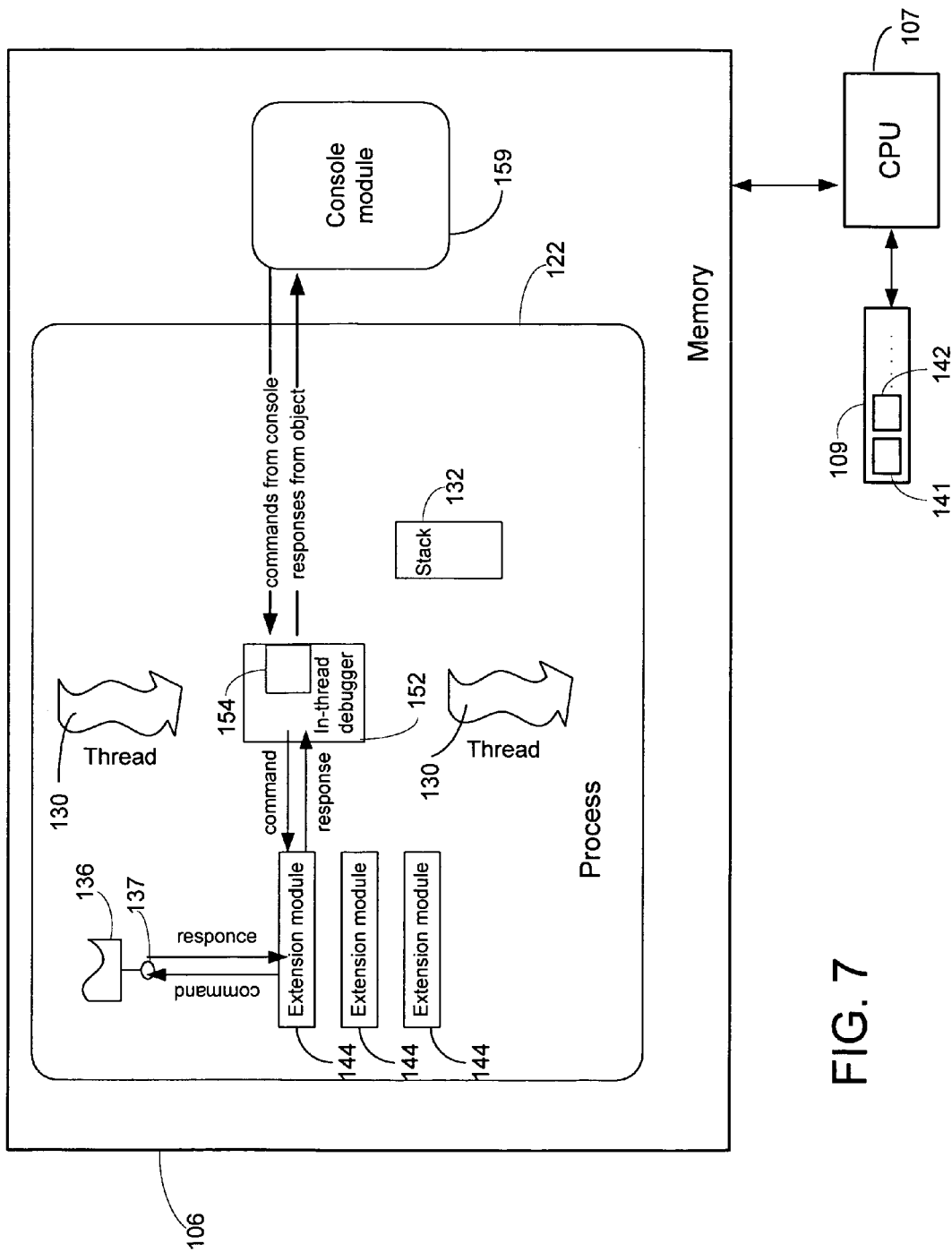
FIG. 7 is a block diagram showing an example of how the in-thread debugger may use extension modules in accordance with the teachings of the invention.

At step 512, the loader module 157 writes the old value of the instruction pointer 142 (inserted into the loader module 157 at step 504) into the stack 132, thus creating a call-frame that will behave as if called from the program at the location at which the thread 130 was halted. At step 513, the loader module 157 loads the in-thread debugger into the process 122 and calls its entry function (FIG. 7). At step 514, the in-thread debugger module 152 (FIG. 6) creates a socket 154 to the machine specified in the loader module 157, and waits for commands to arrive from the console module 159.

If the in-thread debugger module 152 receives a "go" command, then the flow proceeds to step 526, in which the in-thread debugger module 152 closes the socket 154, cleans up the resources used, and exits. The execution then continues in the loader module 157 at step 527, which restores the state of the thread 130 by, for example, reading it back from the stack 132 and into the register memory 109. If the in-thread debugger module 152 receives a command requiring interaction with an object, then the flow proceeds to step 522, at which the in-thread debugger module 152 converts the command into a call to a public interface of the object. The in-thread debugger module 152 then makes the function call at step 524. The function call may be performed by one or more extension modules 144 that get loaded by the in-thread debugger module 152 as needed. The extension modules will be discussed below. When the response is received from the object, the in-thread debugger module 152 relays it to the console module 159. The in-thread debugger module then returns to a wait state at step 514.

There are many variations possible to the above-described steps. For example, when implementing in a WINDOWS 2000 environment, the in-thread debugger module 152 may be inserted into the context of the thread 130 using the SetThreadContext API at step 513 (FIG. 4). It is also possible to insert the in-thread debugger module 152 without the aid of a conventional debugger. The in-thread debugger module 152 may be invoked in a variety of ways, such as by the thread 130 itself at a predefined break or on error. Additionally, the in-thread debugger may take the place of the conventional debugger initially. In such a case, the in-thread debugger module may be designed to recognize a special command for invoking a conventional debugger. For example, if the user types in "break" at the console module 159 (FIG. 7), the in-thread debugger module 152 could respond by issuing a debug breakpoint, and loading a conventional debugger into the process 122 (this may be implemented as a "DebugBreako( )" in the MICROSOFT WINDOWS 2000 environment). When the user exits the conventional debugger, the in-thread debugger module 152 may then resume.

According to an embodiment of the invention, the in-thread debugger may use one or more debug extension modules 144, as shown in FIG. 7. Each debug extension module implements a set of simple functions for converting commands into one or more function calls. Each debug extension module may be shipped along with a corresponding object library. For example, a set of debug extension modules may be provided along with the WINDOWS 2000 operating system or the development kit to investigate the basic COM interfaces like IStream, and IStorage. The debug extension modules can also be generated automatically from IDL files or from the object declarations. The Type-Library information (TLB files) or the symbolic information (PDB files) can also be used to convert commands into interface calls.

Figure 8:
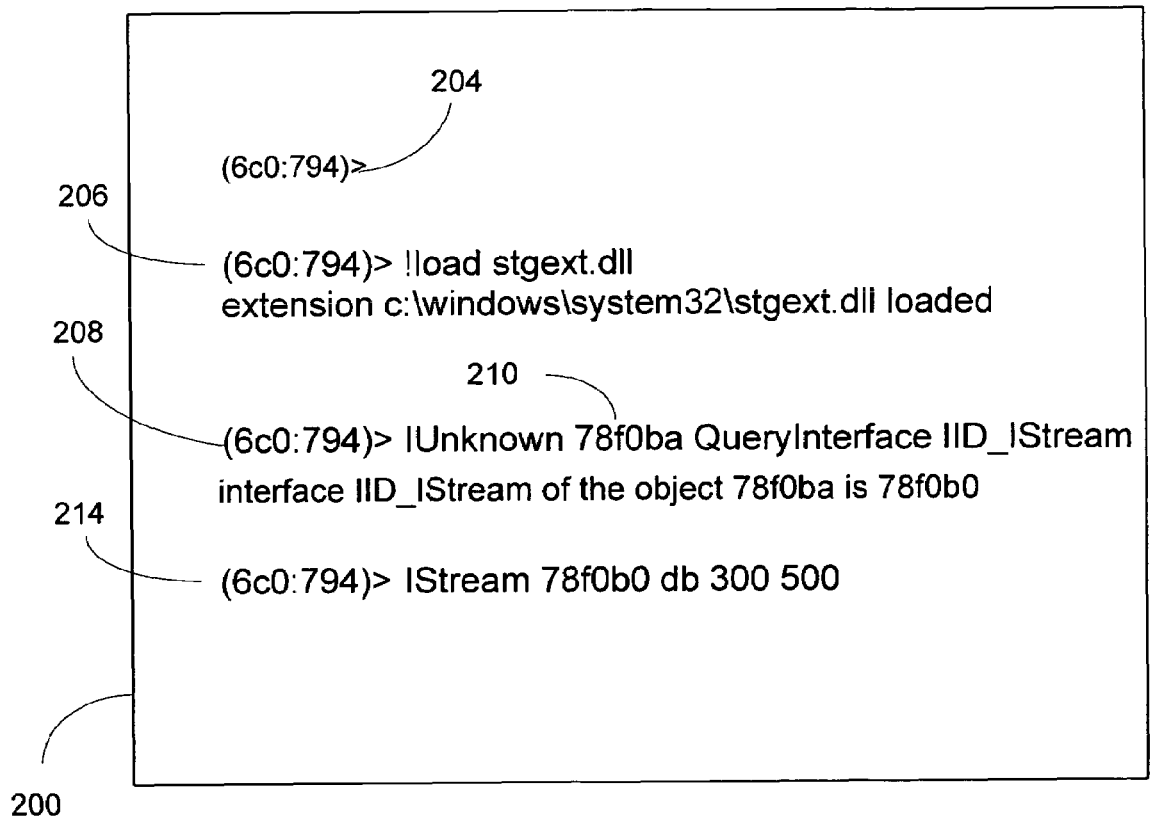
FIG. 8 generally illustrates an embodiment of a user interface for a command console in accordance with the teachings of the invention.

Referring to FIG. 8, an example an embodiment of a user interface, generally labeled 200, for the console module 159 of FIGS. 3 and 5-7 is shown. When the debugger is in a wait state, it sends a prompt string 204, which is displayed in the interface 200. The user then may enter a commands, which are sent as a string to the debugger 152. The debugger 152 then searches the loaded extension modules 144 to locate the function in which the command is defined. The debugger 152 then executes the function, which handles this command.

An example of how a user may use the in-thread debugger to read data from a public interface of a COM or DCOM object will now be described. The commands shown are only meant to be illustrative. It is assumed that a debuggee thread has been halted, that an in-thread debugger has already been inserted into the debuggee thread, and that the user is on a computer that is executing a command console module linked for communication with the in-thread debugger, as depicted, for example, in FIG. 7. Referring to FIG. 8, on line 206 the user tells the debugger to load the extension which supports the IStream and IStorage interfaces by entering the command "!load stgext.dll." On line 208 the user enters the text "IUnkown 78f0ba QueryInterface IID_IStream"—which means "query the IUnkown interface and return a pointer to the IStream interface." Here it is assumed that the user has obtained a pointer 210 to the object (by, for example, reading it from the current thread stack), and that the value of the pointer is hex 78f0ba. The user receives the response "interface IID_IStream of the object 78f0ba is 78f0b0." On line 214, the user then uses the newly obtained pointer 78f0ba to find out the contents of a block of data in the object by entering "IStream 78f0b0 db 300 500"—which means "initialize IStream pointer with value of hex 78f0b0, call IStream::Seek to the position 0×300, call IStream::Read for 0×200 bytes, and print out the data in byte format."

According to an embodiment of the invention, a single command console module may be used to debug multiple threads through the use of a multiplexor module. To illustrate, reference is made to FIG. 9, in which a computer 250 is communicatively linked to a computer 252 via a network link 254. Processes 264, 266 and 268 are defined on computers 256, 258 and 260 respectively. The processes 264, 266 and 268 include in-thread debugger modules 270, 272 and 274. Each in-thread debugger module may operate within a thread of execution of a program in its process, similar to the in-thread debugger module 152 of FIGS. 3 and 6-7. The in-thread debugger modules have sockets 280, 282 and 284, which may be created by the in-thread debugger modules as previously described. The computer 252 is itself communicatively linked to computers 256, 258 and 260 by a network link 262. A console module 276 executes on the computer 250 to receive commands from a user and transmit them to the in-thread debuggers in a manner similar to that of the console module 159 of FIGS. 3 and 7, except that, as will be described in more detail, the console module 276 allows a user to select a process with which to communicate. A multiplexor module 278 executes on the computer 252 to route commands and responses between the processes 264, 266 and 268 and the console module 276. The multiplexor module 278 may, using standard networking protocols, communicate with the console module 276, and with the processes 264, 266 and 268 via the sockets 280, 282 and 284. Communication between the multiplexor module 278 and a socket will hereinafter be referred to as a "session." A session is a well-known abstraction used to logically describe communication with a socket.

Figure 9:
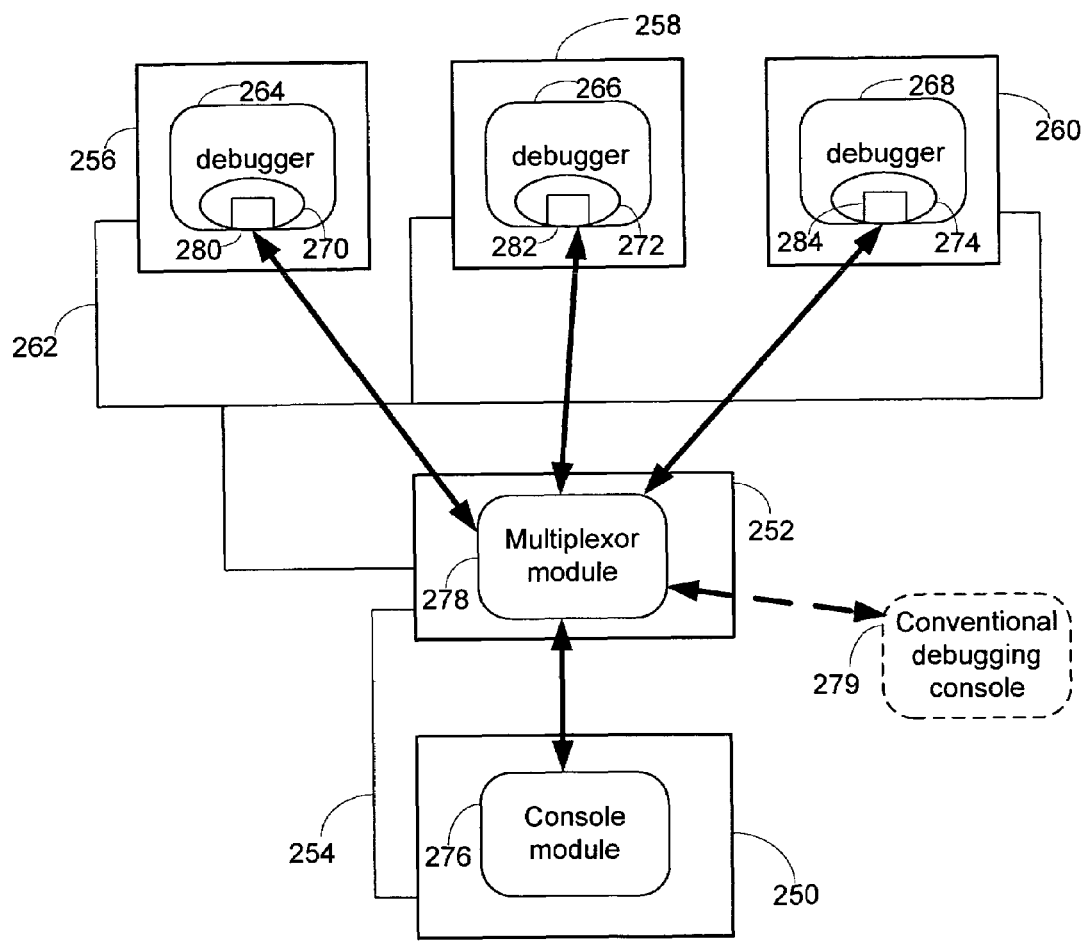
FIG. 9 is a block diagram generally illustrating how multiple debuggers may be controlled in accordance with the teachings of the invention.

In the embodiment of FIG. 9, the console module 276 and the multiplexor module 278 allow a user to select a process out of the processes 264, 266 and 268, enter a command, and have the command converted into a function call to an object in that process. The user need not be aware of the location of the machines on which the objects and processes are stored or executing. The console module 276 opens up one user interface for process 264, one for the process 266 and one for the process 268. Each interface is associated with one of the sockets, and communicates with the associated socket in a session. The user may enter a command into the user interface corresponding to the process having the thread to which he or she wishes to have the command sent. The console module 276 sends the command to the multiplexor module 278. Based on the logical mapping between the interface at which the command is entered and the socket sessions, the multiplexor module 278 sends the command to the appropriate process via the appropriate socket. Although the processes 264, 266 and 268 are depicted as executing on separate computers, the multiplexor module 278 can also route commands and responses to and from multiple processes executing on the same computer. If one or more conventional debugging session is required, the conventional debugging commands may be directed to the multiplexor 278 by, for example, a conventional debugger console 279 (shown as a dashed line), which may be located on a separate computer.

Figure 10:
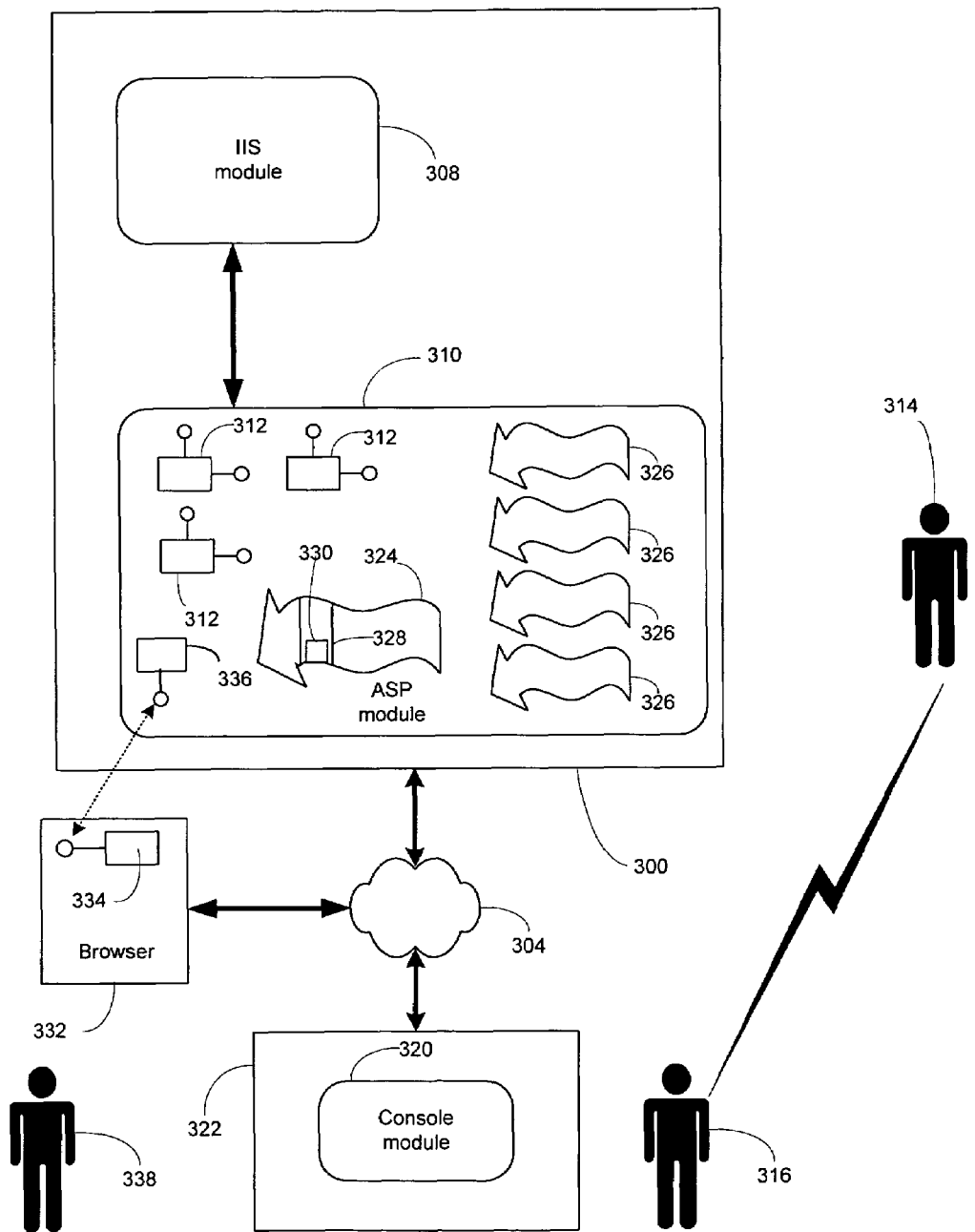
FIG. 10 is a block diagram showing an example of how a debugger may be inserted into a thread of a mission-critical system in accordance with the teachings of the invention.

Mission-critical systems that cannot afford to be shut down for debugging may benefit from an in-thread debugger that operates in accordance with the teachings of the present invention. An example of such a system and how it can be maintained in accordance with an embodiment of the invention will now be described. Referring to FIG. 10, a commercial web server 300 facilitates electronic commerce purchases for a large number of consumers at any given time via a public network 304, which may be the Internet. A module 308 of MICROSOFT INTERNET INFORMATION SERVER (IIS) executes on the web server 300 and cooperates with a MICROSOFT ACTIVE SERVER PAGE (ASP) module 310 to receive and fulfill purchase requests from consumers. As is conventional, the ASP module 310 includes several COM objects 312. The ASP module 310 communicates with a consumer 338 via the consumer's browser 332. If the ASP module 310 begins experiencing errors, a technician 314 at the server 300 contacts a consultant 316 at a remote service center. The consultant 316 instructs the technician 314 to give the consultant 316 the necessary permission to access the web server 300 and to make modifications. The consultant 316 may then execute an instance of a console module 320 on a computer 322 and remotely access the web server 300 via the public network 304. The consultant 316 may then execute a thread 324 of the ASP module 310. The thread 324 may run concurrently with many other threads 326 that are currently fulfilling consumers purchase requests. Running a separate thread for diagnostic purposes allows the consultant 316 to service the ASP module 310 without having to shut it down or otherwise slow down the purchase requests. The consultant 316 may then inject an in-thread debugger 328 into the thread 324, communicate with the in-thread debugger 328 via a socket 330, make function calls to the various COM objects 312, receive results, and thereby diagnose the problem. During the debugging process, the consultant 316 may even access an object 314 running on the consumer's browser 332, via a proxy 336.

It can thus be seen that a new and useful method and system for debugging program has been described. In view of the many possible embodiments to which the principals of this invention may be applied, it should be recognized that the embodiments described herein with respect to the drawing figures is meant to be illustrative only and should not be taken as limiting the scope of the invention. It should also be recognized that the various steps involved in carrying out the methods described above as well as the specific implementation of each step described above may be changed in ways that will be apparent to those of skill in the art.

Finally, those of skill in the art will recognize that the elements of the illustrated embodiment shown in software may be implemented in hardware and vice versa, and that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-implemented method for debugging a program on a computer, the program including at least one object and executing within a process defined within a memory, the computer-implemented method comprising:

loading a debugger into a thread of execution of the program being debugged;

running the debugger in the thread of execution being debugged to debug the program;

calling an interface of the object via the debugger;

creating a socket for communicating with the debugger;

sending commands through the socket to the debugger for conversion into function calls to the object interface;

establishing communication with a console module located outside of the process;

receiving a command from the console module; and converting the command into functions calls to the object interface.

2. The computer-implemented method of claim 1, wherein the program is executing on a first computer and the object is located on a second computer that is in communication with the first computer, the method further comprising calling a proxy interface via the debugger, wherein the proxy interface is located on the first computer and has a pointer to the object.

3. The computer-implemented method of claim 1, wherein the object is a COM object or a DCOM object.

4. A computer-readable storage medium having stored thereon computer-executable instructions that, when executed by one or more processors, cause the one or more processors to perform the computer-implemented method of claim 1.

5. A computer-readable storage medium having stored thereon computer-executable instructions that, when executed by one or more processors, cause the one or more processors to perform the computer-implemented method of claim 2.

6. A computer-readable storage medium having stored thereon computer-executable instructions that, when executed by one or more processors, cause the one or more processors to perform the computer-implemented method of claim 3.

7. A computer-implemented method for debugging a program on a computer, the program executing within a process defined within a memory, the computer-implemented method comprising:
- halting a thread of execution of the program being debugged, wherein the thread is associated with context data describing context of the thread;
- obtaining a pointer to an interface of an object of the program from the context data;
- referencing the pointer to make function calls manually to the object interface from within the context of the thread being debugged;
- establishing communication with a console module located outside of the process, the establishing comprising creating a socket within the context of the thread and communicating with the console module via the socket;
- receiving a command from the console module; and
- converting the command into functions calls to the object interface.

8. The computer-implemented method of claim 7, wherein the object is a COM object or a DCOM object.

9. A computer-readable storage medium having stored thereon computer-executable instructions that, when executed by one or more processors, cause the one or more processors to perform the computer-implemented method of claim 7.

10. Stored on a computer having a memory, a system for communicating with an object that is accessible by a program having a thread of execution within the memory, the thread being associated with context data for describing a context of the thread, the system comprising:
- a debugger module of a plurality of debugger modules running on the thread of execution on which the object is accessible to the program, the thread of execution on which the object is accessible to the program having the context of the thread of the program being debugged;
- a socket accessible by the debugger module for sending and receiving messages;
- a console module operating outside of the context of the thread for receiving a command from a user and sending the command to the debugger module via the socket, wherein the debugger module: (i) receives the command on the thread of execution on which the object is accessible to the program; (ii) converts the command into a function call to the object; and (iii) invokes the function call on the thread of execution on which the object is accessible to the program; and
- a multiplexor module for multiplexing commands from the console module to each of the plurality of debugger modules.

11. The system of claim 10, wherein each of the plurality of debugger modules is associated with a socket session, and the commands entered at the console module are multiplexed to an appropriate one of the plurality of debugger modules based on the socket session.

* * * * *